United States Patent
Botti et al.

(10) Patent No.: US 9,194,285 B2
(45) Date of Patent: Nov. 24, 2015

(54) HYBRID DRIVE AND ENERGY SYSTEM FOR AIRCRAFT

(71) Applicants: EADS Deutschland GmbH, Ottobrunn (DE); Eurocopter Deutschland GmbH, Donauwörth (DE)

(72) Inventors: Jean Botti, München (DE); Johannes Stuhlberger, Tegernsee (DE); Peter Jänker, Riemerling (DE); Valentin Klöppel, München (DE); Georg Niesl, München (DE)

(73) Assignees: EADS Deutschland GmbH (DE); Airbus Helicopters Deutschland GmbH (DE)

( * ) Notice: Subject to any disclaimer, the term of this patent is extended or adjusted under 35 U.S.C. 154(b) by 81 days.

(21) Appl. No.: 13/680,509

(22) Filed: Nov. 19, 2012

(65) Prior Publication Data
US 2013/0147204 A1    Jun. 13, 2013

Related U.S. Application Data (63) Continuation of application No. PCT/EP2011/058125, filed on May 19, 2011.

(30) Foreign Application Priority Data

May 19, 2010 (DE) .......... 10 2010 021 026

(51) Int. Cl.
| | |
|---|---|
| B64C 27/00 | (2006.01) |
| F02B 63/04 | (2006.01) |
| B64D 27/24 | (2006.01) |
| B64D 27/02 | (2006.01) |

(52) U.S. Cl.
CPC ............. *F02B 63/04* (2013.01); *B64D 27/24* (2013.01); *B64D 2027/026* (2013.01); *Y02T 50/64* (2013.01); *Y10S 903/903* (2013.01)

(58) Field of Classification Search
USPC ........... 244/17.11, 17.19, 17.23, 54, 53 R, 55
See application file for complete search history.

(56) References Cited

U.S. PATENT DOCUMENTS

| | | | | |
|---|---|---|---|---|
| 1,754,192 | A | * | 4/1930 | Van Vliet ........................ 416/26 |
| 2,378,617 | A | * | 6/1945 | Burke ............................ 416/121 |
| 2,462,201 | A | | 2/1949 | Kilgore et al. |

(Continued)

FOREIGN PATENT DOCUMENTS

| | | |
|---|---|---|
| CH | 422530 A | 10/1966 |
| CN | 1686758 A | 10/2005 |

(Continued)

OTHER PUBLICATIONS

U.S. Appl. No. 13/679,110, filed Nov. 16, 2012.

(Continued)

*Primary Examiner* — Medhat Badawi
(74) *Attorney, Agent, or Firm* — Lerner, David, Littenberg, Krumholz & Mentlik, LLP (57) ABSTRACT

A hybrid drive system for aircraft, in particular helicopters, with at least one energy generating module having an internal combustion engine and a generator that can be powered by the latter to generate electrical energy, and at least one electric motor for powering a drive means of the aircraft.

13 Claims, 5 Drawing Sheets

(56) References Cited

U.S. PATENT DOCUMENTS

| | | | |
|---|---|---|---|
| 2,514,822 A * | 7/1950 | Wolfe, Jr. | 244/2 |
| 3,332,404 A * | 7/1967 | Lovercheck | 123/55.2 |
| 3,332,643 A * | 7/1967 | Toner | 244/7 R |
| 4,554,989 A | 11/1985 | Gruich et al. | |
| 4,601,444 A | 7/1986 | Lindenbaum | |
| 4,605,185 A * | 8/1986 | Reyes | 244/60 |
| 4,702,437 A * | 10/1987 | Stearns, Jr. | 244/17.11 |
| 4,703,906 A | 11/1987 | Eickmann | |
| 4,953,811 A * | 9/1990 | Smith | 244/17.19 |
| 4,955,560 A * | 9/1990 | Nishina et al. | 244/53 R |
| 5,174,523 A * | 12/1992 | Balmford | 244/17.11 |
| 5,219,143 A | 6/1993 | Staple et al. | |
| 5,390,543 A | 2/1995 | Staple et al. | |
| 6,171,055 B1 * | 1/2001 | Vos et al. | 416/1 |
| 6,568,633 B2 * | 5/2003 | Dunn | 244/59 |
| 6,609,378 B2 * | 8/2003 | Scott | 60/773 |
| 7,011,274 B1 | 3/2006 | Hardoin | |
| 7,147,072 B2 | 12/2006 | Botti | |
| 7,472,863 B2 * | 1/2009 | Pak | 244/12.5 |
| 7,857,254 B2 * | 12/2010 | Parks | 244/12.4 |
| 8,056,344 B2 | 11/2011 | Remy et al. | |
| 8,152,096 B2 * | 4/2012 | Smith | 244/60 |
| 8,453,962 B2 * | 6/2013 | Shaw | 244/17.23 |
| 2002/0005456 A1 * | 1/2002 | Toulmay | 244/17.13 |
| 2003/0085319 A1 | 5/2003 | Wagner et al. | |
| 2003/0230671 A1 | 12/2003 | Dunn | |
| 2004/0007644 A1 | 1/2004 | Phelps et al. | |
| 2005/0045762 A1 | 3/2005 | Pham | |
| 2006/0027701 A1 * | 2/2006 | Eglin | 244/17.11 |
| 2006/0048988 A1 * | 3/2006 | Dreibholz et al. | 180/213 |
| 2006/0060693 A1 | 3/2006 | Poltorak | |
| 2006/0138278 A1 * | 6/2006 | Gans | 244/58 |
| 2006/0185356 A1 | 8/2006 | O'Brien | |
| 2006/0231676 A1 * | 10/2006 | Kusic | 244/17.11 |
| 2008/0006739 A1 * | 1/2008 | Mochida et al. | 244/60 |
| 2008/0035786 A1 | 2/2008 | Bilyk et al. | |
| 2008/0145220 A1 | 6/2008 | Yeh et al. | |
| 2008/0179452 A1 | 7/2008 | Kinkopf et al. | |
| 2008/0184906 A1 | 8/2008 | Kejha | |
| 2009/0140095 A1 * | 6/2009 | Sirohi et al. | 244/17.19 |
| 2009/0145998 A1 * | 6/2009 | Salyer | 244/17.23 |
| 2009/0293494 A1 | 12/2009 | Hoffjann et al. | |
| 2010/0012223 A1 | 1/2010 | Yoshida | |
| 2010/0038473 A1 * | 2/2010 | Schneider et al. | 244/60 |
| 2010/0044498 A1 * | 2/2010 | Palcic et al. | 244/17.21 |
| 2010/0072318 A1 * | 3/2010 | Westenberger | 244/54 |
| 2010/0123039 A1 * | 5/2010 | Buhl et al. | 244/17.19 |
| 2010/0127114 A1 * | 5/2010 | Nakayama et al. | 244/17.21 |
| 2010/0230547 A1 | 9/2010 | Tayman | |
| 2011/0031355 A1 | 2/2011 | Alvarez | |
| 2011/0073717 A1 * | 3/2011 | Foucault et al. | 244/53 R |
| 2011/0108663 A1 * | 5/2011 | Westenberger | 244/60 |
| 2011/0147511 A1 | 6/2011 | Poltorak | |
| 2012/0056040 A1 | 3/2012 | Brotherton-Ratcliffe et al. | |
| 2012/0234968 A1 | 9/2012 | Smith | |
| 2012/0256042 A1 | 10/2012 | Altmikus et al. | |
| 2013/0062455 A1 * | 3/2013 | Lugg et al. | 244/12.3 |

FOREIGN PATENT DOCUMENTS

| | | |
|---|---|---|
| CN | 1857965 A | 11/2006 |
| CN | 101497370 | 8/2009 |
| CN | 101628627 A | 1/2010 |
| DE | 1581060 B1 | 9/1969 |
| DE | 2628274 A1 | 1/1978 |
| DE | 102004044646 A1 | 3/2006 |
| DE | 102004043589 A1 | 4/2006 |
| DE | 102005046729 A1 | 4/2007 |
| DE | 102006056354 A1 | 6/2008 |
| DE | 102006056356 A1 | 6/2008 |
| DE | 202007006976 U1 | 9/2008 |
| DE | 102007013732 A1 | 10/2008 |
| DE | 102008014404 A1 | 10/2009 |
| DE | 102008028866 A1 | 12/2009 |
| DE | 102008046486 A1 | 3/2010 |
| DE | 102008057715 A1 | 5/2010 |
| EP | 1630097 A1 | 3/2006 |
| EP | 2159903 A2 | 3/2010 |
| FR | 2931456 A1 | 11/2009 |
| GB | 2419122 A | 4/2006 |
| JP | 05193581 A | 8/1993 |
| JP | 1999-147499 | 6/1999 |
| WO | 03106259 A2 | 12/2003 |
| WO | 2006113877 A2 | 10/2006 |
| WO | 2008086774 A2 | 7/2008 |
| WO | 2008138972 A1 | 11/2008 |
| WO | 2009025231 A1 | 2/2009 |
| WO | 2009153236 A2 | 12/2009 |
| WO | 2010106343 A2 | 9/2010 |

OTHER PUBLICATIONS

U.S. Appl. No. 13/679,209, filed Nov. 16, 2012.
Mazurkiewicz, John, "Load Inertia and Motor Selection", Baldor Electric, Table 1.
Chinese Office Action for Application No. 201180024796.9 dated Jun. 4, 2014 (English Summary provided.).
Chinese Office Action for Application No. 201180024796.9 dated Feb. 2, 2015.

\* cited by examiner

HYBRID DRIVE AND ENERGY SYSTEM FOR AIRCRAFT

CROSS-REFERENCE TO RELATED APPLICATIONS

The present application is a continuation of International Application No. PCT/EP2011/058125, filed May 19, 2011, published in German, which claims priority from German Patent Application No. 10 2010 021 026.9, filed on May 19, 2010, the disclosures of which are incorporated herein by reference.

FIELD OF THE INVENTION

The invention relates to a hybrid drive system for aircraft, in particular helicopters, as well as to helicopters with this type of hybrid drive system.

BACKGROUND OF THE INVENTION

Helicopters are traditionally powered by one or more gas turbines, wherein the high speed of the gas turbine must be reduced by a gearbox, which mechanically drives the rotors of the helicopter, for example a main rotor or tail rotor. Such a gearbox obviously places high demands on reliability, and is thus correspondingly complicated, heavy and expensive.

Known from DE 10 2006 056 354 A1 is a hybrid drive for aircraft that comprises a gas turbine for generating a first driving energy and an electric motor for generating a second driving energy. The gas turbine and electric motor are designed in such a way that the first and/or second driving energy can be made available to a drive unit, for example a propeller, of the aircraft. Required for this purpose is a coupling between the gas turbine and electric motor, or a first coupling between the gas turbine and propeller shaft, and a second coupling between the electric motor and propeller shaft. A fuel cell system and a battery can be provided for the electric motor.

Known from DE 10 2006 056 356 A1 is a drive with several energy converters for an aircraft, wherein each of the energy converters can be designed as a gas turbine, reciprocating piston engine or electric motor. Required here as well is a clutch between a first and second energy converter, or between the first and second energy converter and a propeller. Let it also be mentioned in this conjunction that only one electric motor is used for cruising flight or in proximity to an airport, while an internal combustion engine is additionally required during takeoff and landing.

WO 2008/086774 A2 proposes an aircraft propeller drive with a propeller, a motor and a drive train between the propeller and motor, wherein the drive train comprises a torsional vibration damper. Between a diesel engine and gearbox input shaft an electric machine may be provided, which can charge a battery when connected as a generator, and can additionally power the diesel engine when connected as an electric motor and supplied by the battery.

SUMMARY OF THE INVENTION

A first aspect of the invention proposes a hybrid drive system for aircraft, in particular helicopters, with at least one energy generating module having an internal combustion engine and a generator that can be powered by the latter to generate electrical energy, and at least one electric motor for (directly or indirectly) powering a drive means of the aircraft.

For example, the drive means is the main rotor or tail rotor of a helicopter. For example, the electric motor can provide additional power for a conventional drive of a helicopter.

Another aspect of the invention provides a second electric motor for powering a second drive means of the aircraft, wherein the second drive means can be another rotor or tail rotor of a helicopter.

Another aspect of the invention provides at least one other energy generating module. The latter can be a combination of a second internal combustion engine and a second generator; however, it can also be a fuel cell unit, for example.

Another aspect of the invention provides a storage unit for electrical energy, for example a battery unit. This storage unit can be configured in such a way as to allow a helicopter to take off and ascend using energy supplied solely or in large part by the storage unit, which drives a first electric motor for powering a first drive means, and a second electric motor for powering a second drive means of the helicopter. A further, additional storage unit for electrical energy can be provided to further elevate safety, for example a battery unit.

Here, when a helicopter takes off, its internal combustion engine or internal combustion engines are here only run up to the extent necessary for producing the overall power required for takeoff. This leads to significantly reduced noise emissions by comparison to a conventional helicopter drive during takeoff and correspondingly while landing.

In another aspect of the invention, the additional energy generating module is designed as a fuel cell unit. The latter can be used in place of an energy generating module comprised of an internal combustion engine and generator when the latter fails, but also in addition to one or more energy generating modules.

Another significant aspect of the invention relates to a helicopter with a hybrid drive system of the kind illustrated above.

Another aspect of the invention provides such a helicopter with a main rotor and tail rotor, which is designed as a jacketed tail rotor that can be rotated around a vertical axis of the helicopter.

The tail rotor and tail rotor drive can be pivoted around the vertical axis of the helicopter to assist in propulsion during forward flight. To this end, the jacketed tail rotor can be pivoted at the top and bottom, and be equipped with at least one adjustment actuator.

In order to keep ensuring that the main rotor torque is balanced, the tail rotor is only turned to a point where a sufficient lateral acting thrust component still remains.

To allow the jacketed tail rotor to rotate around the vertical axis to a point where it only generates propulsion in the flight direction, a rudder can be provided, which handles the torque balancing function during forward flight.

Another aspect of the invention relates to a method for controlling a hybrid drive system or controlling a helicopter with such a hybrid drive system according to the invention, wherein the additional energy generating module and/or the storage unit for electrical energy is connected to the one energy generating module given an elevated power requirement.

The two energy generating modules each comprised of an internal combustion engine and a generator already create redundancy, which is enhanced even further by the storage unit for electrical energy. Another additional energy generating module (internal combustion engine/generator) and/or an additional storage unit for electrical energy can be provided for an even more elevated power requirement and/or an even more elevated redundancy.

In another aspect of the invention, the at least one electric motor is supplied only by the storage unit for electrical energy during the takeoff and landing phase of the aircraft. This ensures lower noise emissions by comparison to a conventional airplane or helicopter drive.

In another aspect of the invention, the internal combustion engine can be idling or operating at considerably under its rated output during the takeoff and landing phase of the aircraft for safety considerations.

In another aspect of the invention, a helicopter is controlled by turning its tail rotor around the vertical axis to such an extent that a lateral thrust component of the (jacketed) tail rotor offsets the yawing moment caused by the main rotor. As a result, the tail rotor provides a lateral thrust component for offsetting the yawing moment caused by the main rotor, and also the thrust component in the forward direction (flight direction).

However, in another aspect of the invention, controlling the helicopter can involve turning the tail rotor around the vertical axis to such an extent that the tail rotor thrust in the direction of the longitudinal axis of the helicopter is directed toward the back, and that the yawing moment caused by the main rotor is offset by correspondingly adjusting the rudder. This ensures that the tail rotor will optimally support propulsion.

In addition, because a rather significant portion of the helicopter propulsion is achieved by the tail rotor, the noise emission source is shifted from the cabin area (main rotor) of the helicopter further to the back toward the tail rotor, thereby reducing the noise and sound exposure in the helicopter cabin.

BRIEF DESCRIPTION OF THE DRAWINGS

Shown on.

DETAILED DESCRIPTION

The depictions in the figures are schematic and not to scale.

The same or corresponding reference numbers are used for identical or similar elements.

Figure 1:
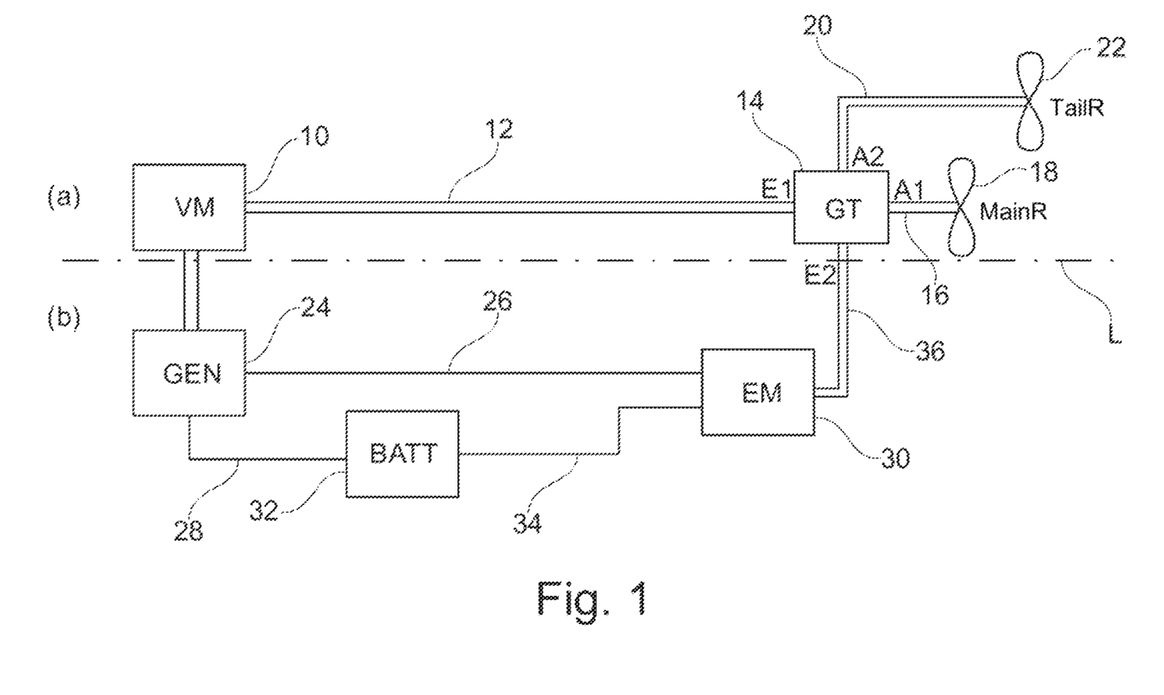
FIG. 1 is a schematic view of a hybrid drive system according to an embodiment of the invention.

FIG. 1 presents a schematic view of the hybrid drive system for aircraft, in particular helicopters. Depicted above the dashed line L at (a) is a conventional helicopter drive, with an internal combustion engine 10, which drives an input E1 of a drive 14 via a shaft 12, wherein the drive then acts by way of an output A1 to power a shaft 16 and a main rotor 18 along with it, as well as a tail rotor 22 of the helicopter via another output A2 by way of a shaft 20.

Also provided under the dashed line L at (b) is a generator 24 powered by the internal combustion engine 10. However, it could also be powered by another internal combustion engine (not shown). Generator 24 supplies current via a line 26 to an electric motor 30, which powers an input E2 of the gearbox 14 via a shaft 36, thereby making additional power available.

In addition, the generator 24 can charge a battery 32 via a line 28, and the battery 32 can supply the electric motor 30 with current via a line 34, for example, in addition to the current supplied by the generator 24, or as an alternative thereto.

Figure 2:
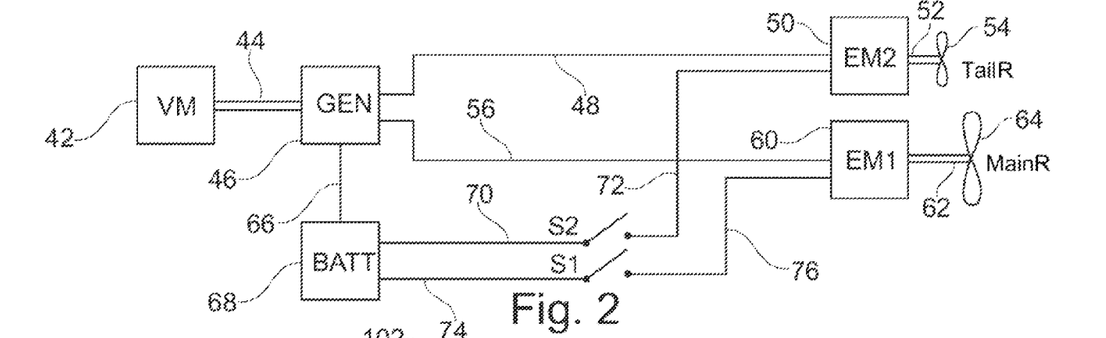
FIG. 2 is a schematic view of a hybrid drive system according to the another embodiment of the invention with an energy generating module.

FIG. 2 shows a hybrid drive system for helicopters, which comprises an internal combustion engine 42 that powers a generator 46 via a shaft 44. Generator 46 supplies current via a line 56 to a first electric motor 60, which powers a main rotor 64 of the helicopter via a shaft 62. In addition, the generator supplies current via a line 48 to a second electric motor 50, which powers a tail rotor 54 of the helicopter via a shaft 52.

Further, the generator 46 can charge a battery (a battery set) 68 via a line 66. For example, this can take place during the cruising flight of the helicopter, when the power required by the electric motor 1 of the main rotor 64 is not as great as during takeoff.

Further, the battery 68 can supply current to an electric motor 60 via a line 74, a switch S1 and a line 76, in addition to the current supplied by the generator 46, or as an alternative thereto. Correspondingly, the battery 68 can supply current to the second electric motor 2 for the tail rotor 64 via a line 70 and a switch S2 and another line 72.

Figure 3:
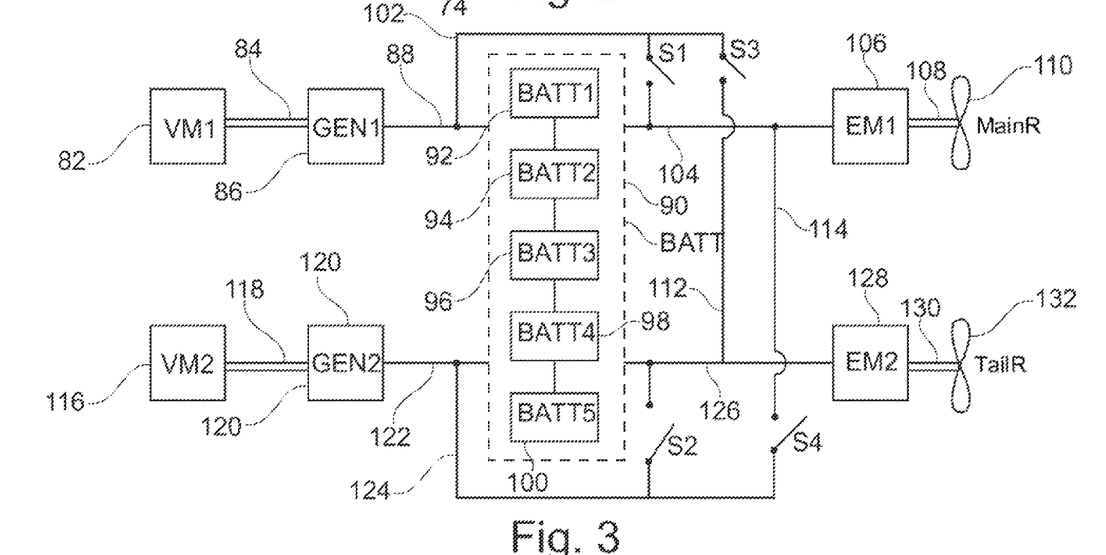
FIG. 3 is a schematic view of a hybrid drive system according to an embodiment of the invention with two energy generating modules.

FIG. 3 presents a hybrid drive system for a helicopter, which provides a first energy generating module having an internal combustion engine 82 and generator 86, as well as a second energy generating module having a second internal combustion engine 116 and a second generator 120. These two energy generating modules can be operated jointly or alternatively if they introduce a corresponding power required for operating the helicopter. However, the first energy generating module 82, 86 can introduce more power in certain operating states of the helicopter, while the second energy generating module 116, 120 can introduce more power in other operating states.

The first generator 86 supplies current via a line 88 to a battery set marked with reference number 90 overall, comprising individual battery subgroups 92, 94, 96, 98, 100, which can be connected in any combinations desired with one of the inputs (lines 88, 122) or outputs (lines 104, 126) of the battery unit 90.

The first generator 86 can use a line 88 and a switch S1 as well as a line 104 to supply a first electric motor 106, which powers the main rotor 110 of the helicopter via a shaft 108.

However, the first generator 86 can also use line 102 and a switch S3 and lines 112, 126 to supply a second electric motor 128, which drives the tail rotor 132 of the helicopter via a shaft 130.

The same holds true for the second generator 120, which can supply current via line 122 and a line 124 and a switch S2 as well as line 126 to the second electric motor 128, or via line 124 and a switch S4 as well as a line 114 and line 104 to the first electric motor 106.

As a result, the hybrid drive system shown on FIG. 3 exhibits a high redundancy owing to the first energy generating module 82, 86, the second energy generating module 116, 120, and the battery unit 90, which represents a temporary energy storage device, and hence another energy generating module for the first electric motor 106 and/or the second electric motor 128.

Each energy generating module on FIG. 3 can be situated at a suitable location in the helicopter, independently of the first electric motor 106 for powering the main rotor 110, and of the second electric motor 128 for the tail rotor 132. For example, the two energy generating modules can be arranged under the cabin floor of a helicopter, just as the battery unit 90. This ensures that relatively heavy components do not have to be located relatively high up in the helicopter as in conventional helicopter drives, so that the center of gravity of the helicopter can instead be shifted downward.

As regards the internal combustion engines, let it be noted that the latter are preferably designed as Wankel rotary engines, even though reciprocating engines such as diesel engines can also be used. A gas turbine can basically also be used as the internal combustion engine.

Conventional helicopter turbo engines comprise two turbine stages, the first one for powering the engine compressor, and the second one for generating the rotor torque. The very high turbine speed must be reduced to the rotor speed by way of gearboxes. By contrast, if the turbine is used for generating energy, i.e., for powering a generator, the second turbine stage and reduction gearbox can be omitted. The first one powers the compressor and generator simultaneously.

The electric motors used in the invention are preferably designed as a low-inertia direct drive with a high power density, as described in DE 10 2007 013 732 A1, i.e., as permanently excited electric machines, which are especially suitable for directly powering the rotors of the helicopter due to their high specific torque and power density, combined with their low moment of inertia.

The concept according to an embodiment of the invention for hybrid drive systems is especially well suited for adjusting a helicopter to an elevated power requirement by providing an additional energy generating module comprised of an internal combustion engine and a generator, or an additional battery unit.

This modular concept is also particularly well suited for powering families of helicopters that vary in size and have different performance requirements. This is because, depending on the requirements, use is made of standardized energy generating modules (internal combustion engine/generator) in the number needed. This represents a so-called family concept, which has significant ramifications with respect to lowering the development costs of a helicopter family.

In particular, the hybrid drive system depicted on FIGS. 2 and 3 enables a "gearless" helicopter, which makes do without the gearbox required in a conventional helicopter drive.

Figure 4:
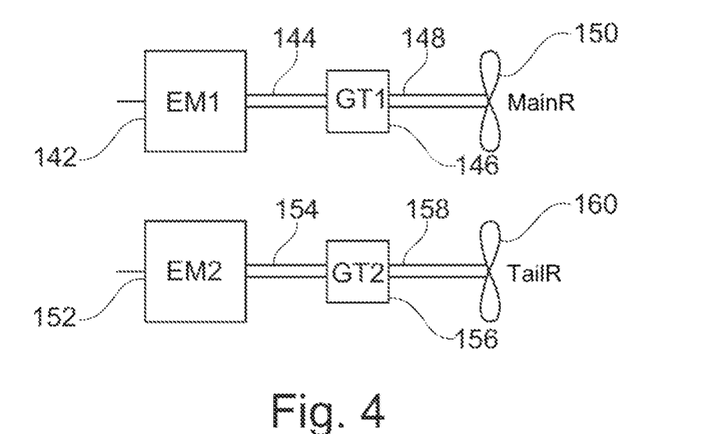
FIG. 4 is a schematic view of a hybrid drive system according to the an embodiment of the invention, wherein a main and tail rotor are each powered by a combination of electric motor and gearbox.

However, should a gearbox be required between the electric motor for the main rotor and/or the electric motor for the tail rotor, it can be provided in proximity to the electric motor and respective rotor according to FIG. 4. FIG. 4 shows a first electric motor 142, which uses a shaft 144 to power a first gearbox 146, which in turn powers a main rotor 150 of a helicopter via a shaft 148. Accordingly, a second electric motor 152 uses a shaft 154 to power a second gearbox 156, which powers a tail rotor 160 of the helicopter via a shaft 158.

Figure 5:
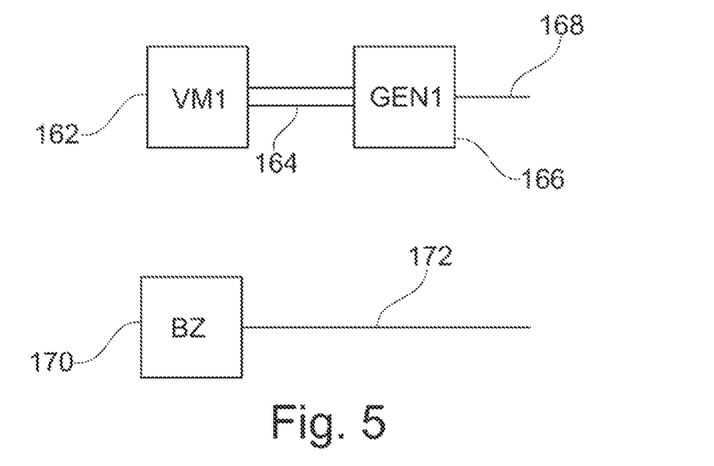
FIG. 5 is a schematic view of a hybrid drive system according to an embodiment of the invention with a first energy generating module having an internal combustion engine and a generator that can be powered by the latter, as well as a second energy generating module designed as a fuel cell system.

The two energy generating modules 82, 86 and 116, 120 on FIG. 3 are similarly designed. However, they can also differ, as shown on FIG. 5. An internal combustion engine 162 uses a shaft 164 to power a generator 166, which releases current via a line 168 corresponding to the line 188 on FIG. 3. A second energy generating module on FIG. 5 consists of a fuel cell 170, which releases current via a line 172 corresponding to line 122 on FIG. 3.

Figure 6:
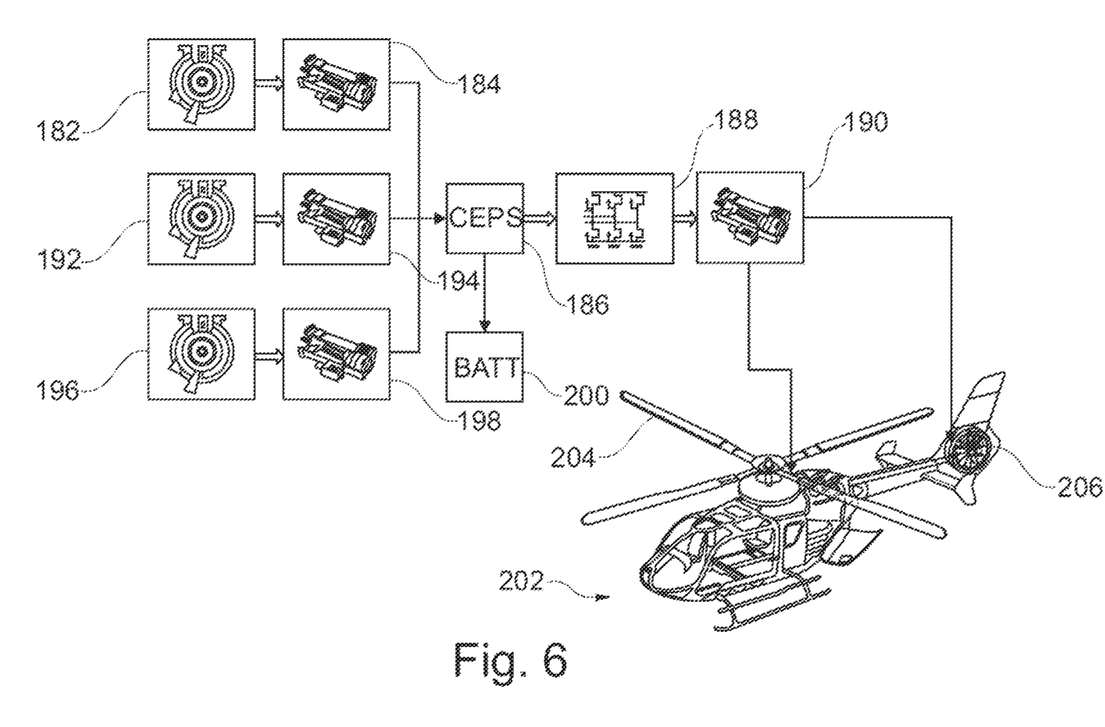
FIG. 6 is a schematic view of the modular structure of the hybrid drive system according to an embodiment of the invention for a helicopter.

FIG. 6 once again illustrates the modular configuration of the hybrid drive system for a helicopter 202 according to the invention. A first energy generating module consists of a Wankel rotary engine 182 and a generator 184, a second energy generating module consists of a Wankel rotary engine 192 and a generator 194, and a third energy generating module consists of a Wankel rotary engine 196 and a generator 198. Each of these energy generating modules or generator 184, 194, 198 corresponding thereto is connected to a central energy control system 186. For example, the latter ensures that a battery 200 is charged or that electrical energy is discharged from the latter. The energy control system 186 delivers electrical energy by way of an inverter 188 to a first electric motor 190 of a main rotor 204 or a second electric motor 190 of a tail rotor 206 of the helicopter 202.

Let it be noted in this conjunction that, in the fly-by-wire controllers based on current prior art that will become increasingly popular in the future, motion sensors on the controls acquire the intended pilot control actions, and report them to the central onboard computer. The latter converts the signals into electrical actuation voltages in order to set the thrust of the main and tail rotors.

In a helicopter with hybrid drive according to the invention, this advantageously takes place electrically, for example in the main rotor in the form of electrical fulcrum shafts under the swashplates that define the blade pitch angle, or via piezoelectrically operated servo flaps on the rear blade edges, or by a combination of both components, and in the tail rotor via such spindles under the sliding sleeve responsible for the blade pitch angle, or by varying the tail rotor speed.

Since all of these control processes take place electrically, and the rotors are also each powered by an electric motor, the helicopter as a whole can be operated with a single form of energy.

An electrical drive is required anyway when varying the speed as mentioned above and pivoting the tail rotor. By contrast, a hydraulic drive that could also be utilized here would violate the requirement for energy uniformity.

Figure 7:
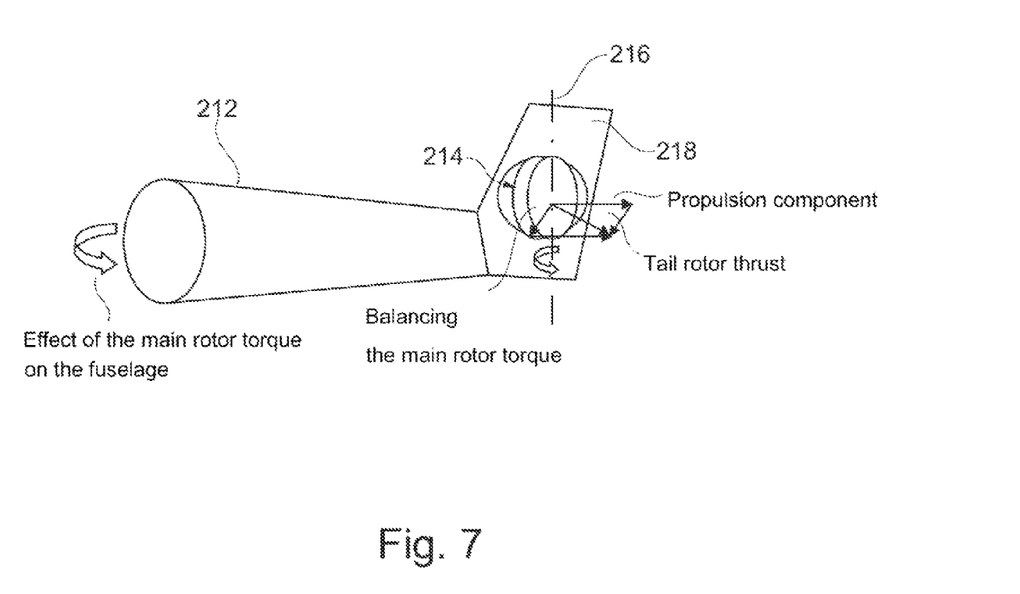
FIG. 7 is a side view of a tail boom of a helicopter according to an embodiment of the invention.
Figure 8:
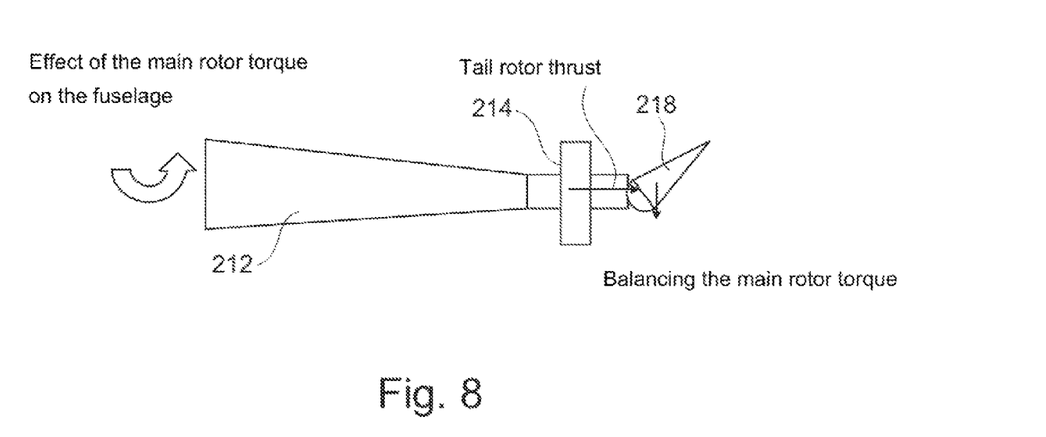
FIG. 8 is a top view corresponding to FIG. 7 of the tail boom of the helicopter according to an embodiment of the invention.

FIGS. 7 and 8 illustrate the construction and operation of a helicopter according to an embodiment of the invention, which is provided with a jacketed tail rotor that can rotate around the vertical axis. FIG. 7 shows an embodiment in which the tail rotor thrust exhibits a lateral component, while a rudder offsets the main rotor torque in the embodiment of FIG. 8.

As depicted in FIG. 7, a tail boom 212 of a helicopter comprises a jacketed tail rotor 214, which can rotate around the vertical axis 216 of the helicopter, so that it provides a propulsion component for advancing the helicopter, but also a lateral component for offsetting the torque caused by the main rotor.

By contrast, the jacketed tail rotor 214 in the embodiment shown in FIG. 8 can be rotated around the vertical axis 216 (FIG. 7) at least during the forward flight (cruising flight) of the helicopter to such an extent that it generates an exclusive propulsion component as the result of the tail rotor thrust. The torque caused by the main rotor is offset by correspondingly adjusting a rudder 218 during cruising flight.

In addition, let it be noted that "encompassing" and "comprising" do not preclude other elements or steps, and that "an" or "a" do not rule out a plurality. Let it further be noted that features or steps that were described with reference to one of the above embodiments can also be used in combination with other features or steps from other embodiments described above. Reference numbers in the claims are not to be construed as limitations.

LIST OF REFERENCE SIGNS

L Dashed line
10 Internal combustion engine
12 Shaft
14 Gearbox
16 Shaft
18 Main rotor
20 Shaft
22 Tail rotor
24 Generator
26 Line
28 Line
30 Electric motor
32 Battery unit
34 Line
36 Shaft
A1, A2 Outputs of 14
E1, E2 Inputs
42 Internal combustion engine
44 Shaft
46 Generator
48 Line
50 Electric motor 2
52 Shaft
54 Tail rotor
56 Line
60 Electric motor 1
62 Shaft
64 Main rotor
66 Line
68 Battery unit
70 Line
72 Line
74 Line
76 Line
S1, S2 Switch
82 Internal combustion engine 1
84 Shaft
86 Generator 1
88 Line
90 Battery unit
92 Battery
94 Battery
96 Battery
98 Battery
100 Battery
102 Line
104 Line
106 Electric motor 1
108 Shaft
110 Main rotor
112 Line
114 Line
116 Internal combustion engine 2
118 Shaft
120 Generator 2
122 Line
124 Line
126 Line
128 Electric motor 2
130 Shaft
132 Tail rotor
142 Electric motor 1
144 Line
146 Gearbox 1
148 Shaft
150 Main rotor
152 Electric motor 2
154 Line
156 Gearbox 2
158 Shaft
160 Tail rotor
162 Internal combustion engine 1
164 Shaft
166 Generator 1
168 Line
170 Fuel cell unit
172 Line
182 Internal combustion engine
184 Generator
186 Energy control system
188 Inverter (a.c. converter)
190 Electric motor
192 Internal combustion engine
194 Generator
196 Internal combustion engine
198 Generator
200 Battery unit
202 Helicopter
204 Main rotor
206 Tail rotor
212 Tail boom
214 Jacketed tail rotor
216 Vertical axis
218 Rudder

The invention claimed is:

1. A hybrid drive system for a helicopter, the system comprising:
a first energy generating module comprising an internal combustion engine and a generator configured to be powered by the internal combustion engine to generate electrical energy;
at least one electric motor for powering a main rotor of the helicopter;
connecting means configured to supply the electrical energy from the generator to the at least one electric motor,
a second electric motor for powering a tail rotor of the helicopter;
a storage unit electrically coupled to the first energy generating module and configured for supplying at least one of the first electric motor and the second electric motor; and
a tail rotor pivotally supported at a top and a bottom of the tail rotor to be rotatable around a vertical axis of the helicopter to such an extent that a lateral thrust component of the tail rotor is configured to offset a yawing moment caused by the main rotor.

2. The hybrid drive system of claim 1, further comprising at least one second energy generating module.

3. The hybrid drive system of claim 2, wherein the first energy generating module and the second energy generating module have the same or similar design.

4. The hybrid drive system of claim 2, wherein the additional energy generating module comprises a fuel cell unit.

5. A helicopter with a hybrid drive system, the hybrid drive system comprising:
- at least one energy generating module comprising an internal combustion engine and a generator configured to be powered by the internal combustion engine to generate electrical energy;
- at least one electric motor for powering a main rotor of the helicopter; and
- a tail rotor pivotally supported at a top and a bottom of the tail rotor to be rotatable around a vertical axis of the tail rotor to such an extent that a lateral thrust component of the tail rotor is configured to offset a yawing moment caused by the main rotor.

6. The helicopter of claim 5, further comprising a main rotor.

7. The helicopter of claim 6, further comprising a rudder.

8. A method for controlling a helicopter hybrid drive comprising a first energy generating module comprising an internal combustion engine and a generator configured to be powered by the internal combustion engine to generate electrical energy, at least one electric motor for powering a main rotor of the helicopter, connecting means configured to supply the electrical energy from the generator to the at least one electric motor, a second energy generating module, a storage unit for electrical energy, and a tail rotor pivotally supported at a top and a bottom of the tail rotor to be rotatable around a vertical axis of the helicopter to such an extent that a lateral thrust component of the tail rotor is configured to offset a yawing moment caused by the main rotor, the method comprising:
- connecting at least one of the second energy generating module and the storage unit for electrical energy to the first energy generating module given an elevated power requirement.

9. The method of claim 8, wherein the first electric motor is supplied only be the storage unit for electrical energy during the takeoff and landing phase of the helicopter.

10. The method of claim 9, wherein the internal combustion engine idles during the takeoff and landing phase of the helicopter.

11. A method for controlling a helicopter comprising at least one energy generating module comprising an internal combustion engine and a generator configured to be powered by the internal combustion engine to generate electrical energy; at least one electric motor for powering a main rotor of the helicopter, connecting means configured to supply the electrical energy from the generator to the at least one electric motor, a second energy generating module, a storage unit for electrical energy, a main rotor and a tail rotor configured as a jacketed tail rotor pivotally supported at a top and a bottom of the tail rotor to be rotated around a vertical axis of the tail rotor to such an extent that a lateral thrust component of the tail rotor is configured to offset a yawing moment caused by the main rotor, and a rudder, the method comprising:
- connecting at least one of the second energy generating module and the storage unit for electrical energy to the one energy generating module given an elevated power requirement.

12. The method for controlling a helicopter of claim 11, wherein the tail rotor is rotated around the vertical axis to such an extent that a lateral thrust component of the tail rotor offsets the yawing moment caused by the main rotor.

13. The method for controlling a helicopter of claim 11, wherein the tail rotor is rotated around the vertical axis to such an extent that the tail rotor thrust in the direction of the longitudinal axis of the helicopter is directed toward a rear of the helicopter, and that the yawing moment caused by the main rotor is offset by correspondingly adjusting the rudder.

* * * * *